United States Patent Office 2,956,053
Patented Oct. 11, 1960

2,956,053

ESTERS OF 6β,16β-DIHALO-3β,5α,17α-TRIHYDROXYPREGNAN-20-ONE

Miguel A. Romero, Juan O'Donoju 310–14, Mexico City 10, Mexico

No Drawing. Filed Jan. 28, 1959, Ser. No. 789,526

6 Claims. (Cl. 260—239.55)

The present invention relates to a novel method for the preparation of the adrenal factor known as Compound S and to intermediates employed therein. Especially it relates to 6β,16β-dihalo-3β,5α,17α-trihydroxypregnan-20-ones and derivatives thereof. These 6β,16β-dihalo-3β,5α,17α-trihydroxypregnane derivatives can be represented by the general structural formula

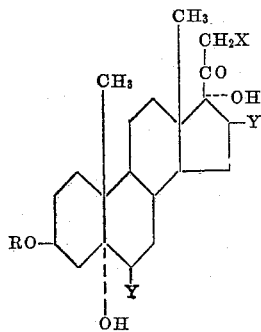

wherein R is hydrogen or an acyl radical derived from a lower alkanoic acid containing preferably fewer than seven carbon atoms, X is hydrogen or halogen, and Y is a halogen, preferably bromine or chlorine.

Where R is an acyl radical, it can be derived from such lower alkanoic acids as acetic, propionic, butyric, pentanoic, and hexanoic acid, and also from benzoic acid.

Where X is halogen, it can represent preferably chlorine, bromine and iodine.

The process of this invention uses as a starting material the readily available 3β-acyloxy-16α,17α-epoxy-5-pregnen-20-one, e.g. the 3β-acetoxy compound. The 3β-acyloxy-5α,6α;16α,17α-diepoxypregnan-20-one is obtained in high yields by treating a 3β-acyloxy-16α,17α-epoxy-5-pregnen-20-one under cooling with a peroxyacid such as peroxyacetic, peroxyphthalic, and peroxybenzoic. A suitable solvent is a haloalkane, particularly a polyhalomethane or polyhaloethane, e.g. dichloromethane, chloroform, and dichloroethane. This procedure for preparing the diepoxide permits a clean separation of the desired 5α,6α-epimer.

The addition of anhydrous hydrogen halide to the diepoxide to form the corresponding 3β-acyloxy-5α,17α-dihydroxy-6β,16β-dihalopregnan-20-one is conveniently performed at low temperature. A haloalkane or a mixture of a haloalkane and a lower alkanoic acid can be employed as a solvent.

One molecular equivalent of chlorine or bromine is then added to the dihalohydrin to yield a 3β-acyloxy-5α,17α-dihydroxy-6β,16β,21-trihalopregnan-20-one. The latter is deesterified to a 3β,5α,17α-trihydroxy-6β,16β,21-trihalopregnan-20-one by treatment with anhydrous hydrogen halide and a lower alkanol such as methanol, ethanol, propanol, isopropanol and butanol. This compound is then treated with an alkali metal iodide in a lower alkanol solvent to yield a 3β,5α,17α-trihydroxy-6β,16β-dihalo-21-iodopregnan-20-one. This is refluxed with a solution of alkali metal acetate in an inert organic solvent such as an aromatic hydrocarbon (e.g. benzene, toluene), lower alkanol (e.g. methanol, ethanol), lower alkanone (e.g. butanone, pentanone), or dioxane to yield the 3β-hydroxy-5α,6α;16α,17α-diepoxy-21-acetoxypregnan-20-one. Chromic acid or Oppenauer oxidation can then be employed to convert the 3β-hydroxy derivative to the 5α,6α;16α,17α - diepoxy - 21 - acetoxypregnane - 3,20-dione. The latter is treated under cooling with an anhydrous hydrogen halide in a haloalkane solvent. Compound S acetate is formed by refluxing the 6,16β-dihalo-17-hydroxy-21-acetoxy-4-pregnene-3,20-dione thus obtained in a lower alkanol solvent in the present of a suitable hydrogenation catalyst, preferably Raney nickel. Alternatively, the halogen at C–6 can be removed by refluxing with zinc dust in a lower alkanol solvent and the halogen at C–16 can be removed by refluxing with Raney nickel in a lower alkanol solvent.

The foregoing reaction sequence provides an economical procedure for the preparation of Compound S and its 21-acetate. These are commercially useful intermediates, e.g. for fermentation to anti-inflammatory agents such as hydrocortisone.

The compounds which constitute this invention and the methods for their preparation will appear more fully from a consideration of the following examples, which are given for the purpose of illustration only and are not to be construed as limiting the invention in spirit or in scope. In these examples quantities are indicated at parts by weight. Temperatures are expressed in degrees centigrade (° C.).

Example 1

While the temperature is maintained at about 0° C., a solution of 50 parts of 3β-acetoxy-16α,17α-epoxy-5-pregnen-20-one in 20 parts of dichloromethane is treated with a mixture of 45 parts of 40% peroxyacetic acid and 2.2 parts of anhydrous potassium acetate. This suspension is maintained for 4 hours at 0° C. and for 12 hours at room temperature. The mixture is then washed first with water and then with dilute sodium bicarbonate solution, dried over anhydrous sodium sulfate, filtered, and evaporated to a small volume. Crystallization of the product is induced by trituration with methanol. The precipitate is recovered by filtration and recrystallized from methanol to yield 3β-acetoxy-5α,6α;16α,17α-diepoxypregnan-20-one which melts at about 207–208° C. and has the specific optical rotation of −19° in chloroform.

Substitution of 55 parts of 3β-butyroxy-16α,17α-epoxy-5-pregnen-20-one for the 3β-acetoxy-16α,17α-epoxy-5-pregnen-20-one in the foregoing procedure yields the white, prismatic crystals of 3β-butyroxy-5α,6α;16α,17α-diepoxypregnan-20-one.

Example 2

A solution of 20 parts of 3β-acetoxy-5α,6α;16α,17α-diepoxypregnan-20-one in a mixture of acetic acid and dichloromethane is cooled to about 4–10° C. Dry, gaseous hydrogen bromide is passed through the solution under anhydrous conditions to yield 3β-acetoxy-5α,17α-dihydroxy-6β,16β-dibromopregnan-20-one. (The specific optical rotation of an isolated sample in chloroform is −11°.)

To the foregoing mixture containing the 3β-acetoxy-5α,17α-dihydroxy-6β,16β-dibromopregnan-20-one is added a solution of 8.3 parts of bromine in dichloromethane in several portions from a burette at the same rate as the bromine is being consumed. The result of this addition is the formation of 3β-acetoxy-5α,17α-dihydroxy-6β,16β,21-tribromopregnan-20-one. (The specific optical rotation of an isolated sample in chloroform is +6°.)

The reaction mixture is then washed with water, dried, and concentrated to about ⅓ its volume. After the addition of 200 parts of methanol, anhydrous hydrogen chloride gas is passed through the solution until approximately 5 parts have been absorbed. This addition of hydrogen chloride gas is carried out at room temperature. The solution is maintained at room temperature for 1 hour and then enough water is added to separate the organic layer, which is washed with water until all the methanol is removed. The 3β,5α,17α-trihydroxy-6β,16β,21-tribromopregnan-20-one precipitate is recovered by filtration. The specific optical rotation is +5° in chloroform.

Substitution of 22 parts of 3β-butyroxy-5α,6α;16α,17α-diepoxypregnan-20-one for the 3β-acetoxy-5α,6α;16α,17α-diepoxypregnan-20-one in the foregoing procedure yields 3β-butyroxy-5α,17α-dihydroxy-6β,16β-dibromopregnan-20-one, 3β-butyroxy-5α,17α-dihydroxy-6β,16β,21-tribromopregnan-20-one, and 3β,5α,17α-trihydroxy-6β,16β,21-tribromopregnan-20-one.

*Example 3*

A solution of 10 parts of 3β,5α,17α-trihydroxy-6β,16β,21-tribromopregnan-20-one in methanol is treated with a solution of 4 parts of sodium iodide in methanol. The reaction mixture is allowed to stand at room temperature for 12 hours. Enough sodium thiosulfate solution is then added with stirring to destroy the iodine liberated. The 3β,5α,17α-trihydroxy-6β,16β-dibromo-21-iodopregnan-20-one is precipitated by the addition of water and collected by filtration. The specific optical rotation in chloroform is +3°.

Alternatively, the 21-iodine derivative can be precipitated by the addition of dichloromethane and by the subsequent washing of the dichloromethane solution with water.

*Example 4*

A mixture of 10 parts of 3β,5α,17α-trihydroxy-6β,16β-dibromo-21-iodopregnan-20-one, 10 parts of anhydrous potassium acetate, and 160 parts of acetone is refluxed for 3½ hours. Water is added to precipitate the 3β-hydroxy-5α,6α;16α,17α-diepoxy-21-acetoxypregnan-20-one which is collected on a filter and recrystallized from a mixture of dichloromethane and methanol. The specific optical rotation is ±0° in chlorofrom.

*Example 5*

A mixture of 10 parts of 3β-hydroxy-5α,6α;16α,17α-diepoxy-21-acetoxypregnan-20-one, 170 parts of toluene, 100 parts of cyclohexanone, and 20 parts of aluminum isopropoxide in 170 parts of toluene is slowly refluxed for a period of 45 minutes. The reaction mixture is cooled, poured into ice water, acidified with dilute sulfuric acid, and extracted with benzene. The benzene extract is steam distilled until all of the cyclohexanone is removed. The precipitated 5α,6α;16α,17α-diepoxy-21-acetoxypregnan-3,20-dione is recovered by filtration and recrystallized from methanol. The specific optical rotation is ±0° in chloroform. Alternatively this product can be prepared by treating a solution of 8 parts of 3β-hydroxy-5α,6α;16α,17α-diepoxy-21-acetoxypregnan-20-one in 80 parts of pyridine with a mixture of 8 parts of chromic acid and 8 parts of pyridine at room temperature. The reaction mixture is then allowed to stand for 12 hours at room temperature. The mixture is extracted with dichloromethane and the extracts are washed with water, dried over anhydrous sodium sulfate, and evaporated to yield 5α,6α;16α,17α-diepoxy-21-acetoxypregnan-3,20-dione which is recrystallized from methanol.

*Example 6*

A solution of 5α,6α;16α,17α-diepoxy-21-acetoxypregnane-3,20-dione in chloroform is treated at a temperature of 0–10° C. with approximately 2.5 moles of anhydrous hydrogen bromide gas. The solution is maintained at 0–10° C. for 30 minutes and then washed with water. The solvent is distilled off under vacuum to yield 6β,16β-dibromo-17α-hydroxy-21 acetoxy-4-pregnene-3,20-dione which is recrystallized from a mixture of dichloromethane and methanol. The specific optical rotation in chloroform is +15°.

*Example 7*

A mixture of 10 parts of 6β,16β-dibromo-17α-hydroxy-21-acetoxy-4-pregnene-3,20-dione and 100 parts of zinc powder is refluxed in ethanol for 6 hours. The reaction mixture is cooled and then filtered. The filtrate is washed with ethanol and refluxed with 20 parts of Raney nickel for 3 hours. The Raney nickel is then removed by filtration and washed with dichloromethane. The filtrate and extracts are combined and evaporated under vacuum. The residue is recrystallized from a mixture of dichloromethane and acetone to yield 17α-hydroxy-21-acetoxyprogesterone, melting at about 241° C.

Alternatively, 17α-hydroxy-21-acetoxyprogesterone can be prepared by refluxing 10 parts of 6β,16β-dibromo-17α-hydroxy-21-acetoxy-4-pregnene-3,20-dione in ethanol with 40 parts of Raney nickel for 4 hours. The Raney nickel is removed by filtration and washed with dichloromethane. The filtrate and extracts are combined and evaporated to dryness to yield the 17α-hydroxy-21-acetoxyprogesterone which is recrystallized from a mixture of dichloromethane and acetone.

*Example 8*

To a mixture of acetic acid and chloroform are added 15 parts of 3β-acetoxy-5α,6α;16α,17α-diepoxypregnan-20-one. The solution is cooled to about 4–10° C., and anhydrous hydrogen chloride gas is introduced into the solution to yield the 3β-acetoxy-5α,17α-dihydroxy-6β,16β-dichloropregnan-20-one.

A mixture of 6.2 parts of bromine in chloroform is added to the foregoing mixture in several portions from a burette at the same rate as the bromine is being consumed. In this manner there is obtained the 3β-acetoxy-5α,17α-dihydroxy-6β,16β-dichloro-21-bromopregnan-20-one.

After the reaction mixture is washed with water, dried, and concentrated to about one-fourth its volume, there are added 175 parts of ethanol. Dry, gaseous hydrogen chloride is passed through the solution until approximately four parts have been absorbed. The solution is allowed to stand at room temperature for about one hour and then the solution is washed with water. The white, crystalline 3β,5α,17α-trihydroxy-6β,16β-dichloro-21-bromopregnan-20-one is recovered by filtration.

*Example 9*

A solution of 3 parts of potassium iodide in ethanol is added to a solution of 11 parts of 3β,5α,17α-trihydroxy-6β,16β-dichloro-21-bromopregnan-20-one in ethanol. The reaction mixture is stirred and then maintained at room temperature for 15 hours. The iodine liberated is destroyed by the addition of potassium thiosulfate solution with stirring. Water is added in order to precipitate the 3β,5α,17α-trihydroxy-6β,16β-dichloro-21-iodopregnan-20-one which is then recovered by filtration.

*Example 10*

For 4 hours a mixture of 120 parts of acetone, 8 parts of sodium acetate, and 8 parts of 3β,5α,17α-trihydroxy-6β,16β-dichloro-21-iodopregnan-20-one is refluxed. The white prismatic crystals of 3β-hydroxy-5α,6α;16α,17α-diepoxy-21-acetoxypregnan-20-one are precipitated by the addition of water, collected on a filter, and recrystallized from a mixture of chloroform and propanol.

What is claimed is:

1. 3β-acetoxy-5α,17α-dihydroxy-6β,16β-dibromopregnan-20-one.

2. 3β-acetoxy 5α,17α-dihydroxy - 6β,16β,21 - tribromopregnan-20-one.

3. 3β,5α,17α-trihydroxy - 6β,16β - dibromo - 21 - iodopregnan-20-one.

4. 3β,5α,17α-trihydroxy - 6β,16β - dichloro - 21 - iodopregnan-20-one.

5. The process for preparing 6β,16β-dibromo-17α-hydroxy-21-acetoxy-4-pregnene-3,20-dione which comprises contacting 5α,6α;16α,17α-diepoxy-21-acetoxy-pregnane-3,20-dione with anhydrous hydrogen bromide with cooling in a haloalkane solvent.

6. The process for preparing 3β-hydroxy-5α,6α;16α,17α-diepoxy-21-acetoxypregnan-20-one which comprises contacting 3β-acetoxy-5α,6α;16α,17α-diepoxypregnan-20-one with anhydrous hydrogen bromide with cooling in a haloalkane solvent; contacting the resulting 3β-acetoxy-5α,17α-dihydroxy-6β,16β-dibromopregnan - 20 - one with bromine in a haloalkene solvent; contacting the resulting 3β-acetoxy-5α,17α-dihydroxy - 6β,16β,21 - tribromopregnan-20-one with a lower alkanol and then with anhydrous hydrogen halide at room temperature in a haloalkane solvent; contacting the 3β,5α,17α-trihydroxy-6β,16β,21-tribromopregnan-20-one thus obtained with an alkali metal iodide in a lower alkanol solvent, and heating the resulting 3β,5α,17α-trihydroxy-6β,16β-dibromo - 21 - iodopregnan-20-one with an alkali metal acetate in an inert organic solvent.

References Cited in the file of this patent
UNITED STATES PATENTS

| | | |
|---|---|---|
| 2,602,769 | Murray et al. | July 8, 1952 |
| 2,726,240 | Moffett | Dec. 6, 1955 |
| 2,751,381 | Slomp | June 19, 1956 |